US 8,458,212 B2

(12) United States Patent
Nelson et al.

(10) Patent No.: US 8,458,212 B2
(45) Date of Patent: Jun. 4, 2013

(54) MEDIA PLAN MANAGING

(75) Inventors: Dorothy Nelson, San Jose, CA (US);
Eunkyung Chung, Kirkland, WA (US);
Aideen J. Stronge, Kenmore, WA (US);
Alex M. Cook, III, San Francisco, CA (US); Alexander D. Kinnier, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/463,205

(22) Filed: May 3, 2012

(65) Prior Publication Data

US 2012/0221607 A1    Aug. 30, 2012

Related U.S. Application Data

(63) Continuation of application No. 12/194,167, filed on Aug. 19, 2008, now Pat. No. 8,176,070.

(60) Provisional application No. 60/972,077, filed on Sep. 13, 2007.

(51) Int. Cl.
*G06F 17/30* (2006.01)

(52) U.S. Cl.
USPC .......................................... 707/769; 705/14.4

(58) Field of Classification Search
USPC .................. 707/705–721, 765–778; 705/14.1, 705/14.2, 14.11–14.19, 14.4, 14.41–14.49
See application file for complete search history.

(56) References Cited

U.S. PATENT DOCUMENTS

| | | | |
|---|---|---|---|
| 6,078,785 A | 6/2000 | Bush | |
| 6,195,652 B1* | 2/2001 | Fish | 1/1 |
| 7,610,575 B2* | 10/2009 | Sproule | 717/103 |
| 2003/0055729 A1 | 3/2003 | Bezos et al. | |
| 2004/0015397 A1 | 1/2004 | Barry et al. | |
| 2005/0065811 A1 | 3/2005 | Chu et al. | |
| 2005/0097440 A1* | 5/2005 | Lusk et al. | 715/500.1 |
| 2005/0114206 A1* | 5/2005 | Bennett et al. | 705/14 |
| 2006/0047562 A1 | 3/2006 | Kiefer et al. | |
| 2007/0033103 A1* | 2/2007 | Collins et al. | 705/14 |
| 2007/0185768 A1 | 8/2007 | Vengroff et al. | |
| 2007/0244753 A1 | 10/2007 | Grouf et al. | |
| 2007/0250901 A1* | 10/2007 | McIntire et al. | 725/146 |
| 2009/0319957 A1* | 12/2009 | Blakey | 715/854 |

OTHER PUBLICATIONS

Marketingpilot Software. MarketingPilot 4.5 At A Glance. pp. 1-14, copyrighted 2007.
Marketingpilot Software. Campaign & Program Management. pp. 1-5, copyright 2000-2006.

* cited by examiner

*Primary Examiner* — Wilson Lee
(74) *Attorney, Agent, or Firm* — Fish & Richardson P.C.

(57) ABSTRACT

Apparatus, system and methods for a media plan managing interface are disclosed. A data hierarchy for a media plan is defined. The multilevel data hierarchy includes different levels for orders and placements. An input form is provided to receive modifications to the values in the different levels of the hierarchy. Any modifications of data are compared against the permitted inputs provided through a conditional input field. If the modifications are permitted inputs, then they are accepted and conditional input fields are set up for any subsequent data input. The data hierarchy is stored as a media plan.

24 Claims, 7 Drawing Sheets

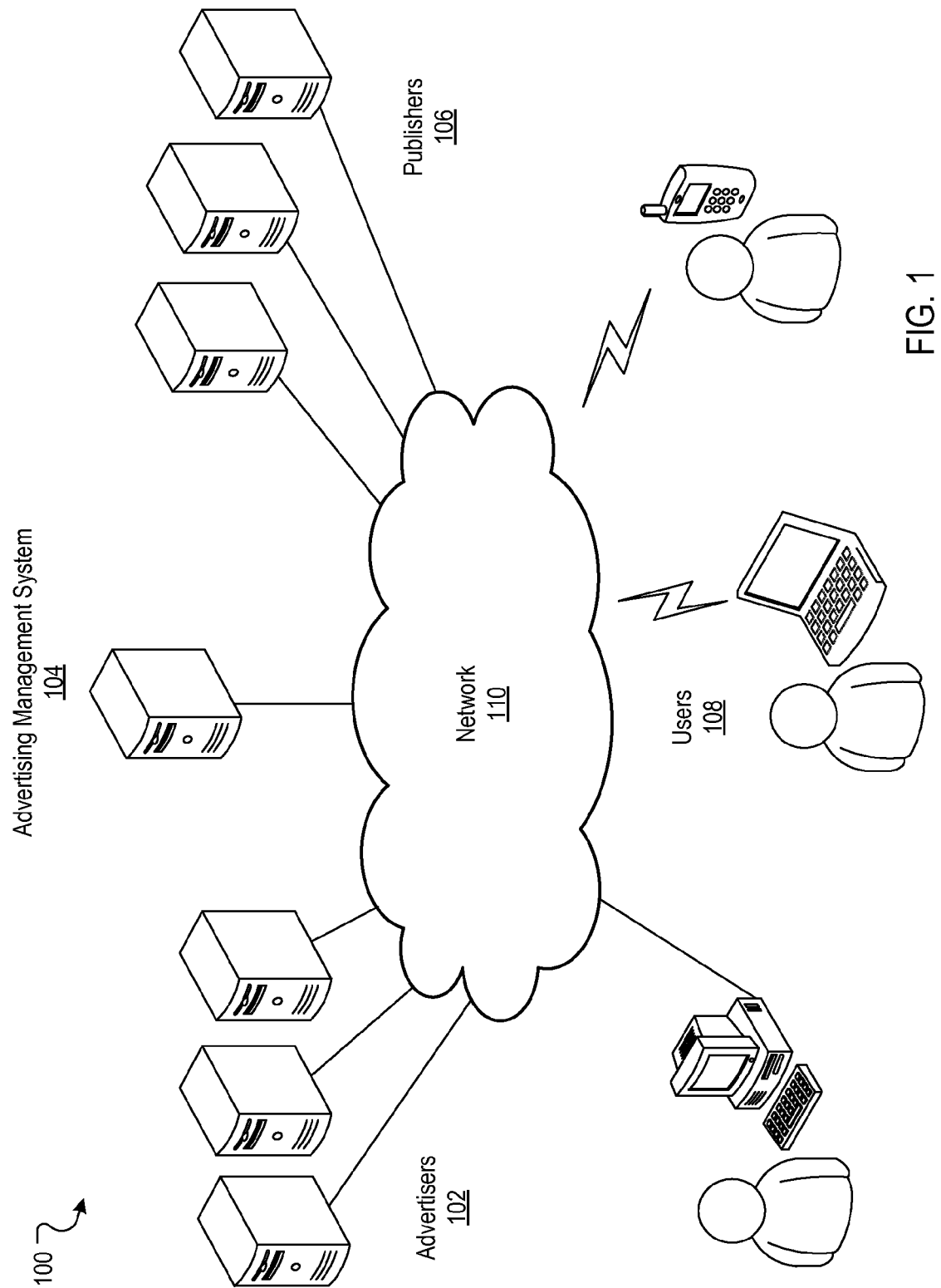

COMPANY A's SUMMER MEDIA PLAN

| Item Type | Publisher | Placement Name | Category | Size | Creative Type | Start Date | End Date | Tag Type | Pricing Type | Quantity | Cost / Rate | Total Spend |
|---|---|---|---|---|---|---|---|---|---|---|---|---|
| Order | Publisher X | | | | | 3/1/2007 | 6/1/2007 | | | | | $350.00 |
| ⋮--Placement | Publisher X | Top Home Banner | finance | 728x60 | Rich media | 3/1/2007 | 5/1/2007 | All types | CPM | 100,000 | $2.00 | $200.00 |
| ⋮--Placement Group Banner | Publisher X | Banners: Top Banner | finance | 728x60 | Image (.gif, .jpg) | | | | | | | |
| | Publisher X | Banners: Bottom Banner | | 728x60 | Image (.gif, .jpg) | 4/1/2007 | 6/2/2007 | All types | CPM | 100,000 | $1.50 | $150.00 |
| Order | Publisher Y | | | | | 3/1/2007 | 6/1/2007 | | | | | $40,200 |
| ⋮--Placement | Publisher Y | Left Side block | money | 300x250 | Rich media | 3/1/2007 | 5/1/2007 | All types | Flat rate | 100,000 | $20,000 | $20,000 |
| ⋮--Placement | Publisher Y | Right Side block | news | 300x250 | Rich media | 3/1/2007 | 5/1/2007 | All types | CPM & CPC | Impr: 50,000 Clicks: 1,000 | CPM:$2.00 CPC:$10.00 | $10,100 |
| ⋮--Placement | Publisher Y | Top Home Banner | money | 728x60 | Rich media | 3/1/2007 | 5/1/2007 | All types | CPM & CPA | Impr: 50,000 Actions: 1,000 | CPM:$2.00 CPA:$10.00 | $10,100 |
| ⋮--Placement Group Banner | Publisher Y | Banners: Top Banner | news | 728x60 | Image (.gif, .jpg) | | | | | | | |
| | Publisher Y | Banners: Bottom Banner | | 728x60 | Image (.gif, .jpg) | 4/1/2007 | 6/2/2007 | All types | CPM | 100,000 | $1.50 | $150.00 |

FIG. 2

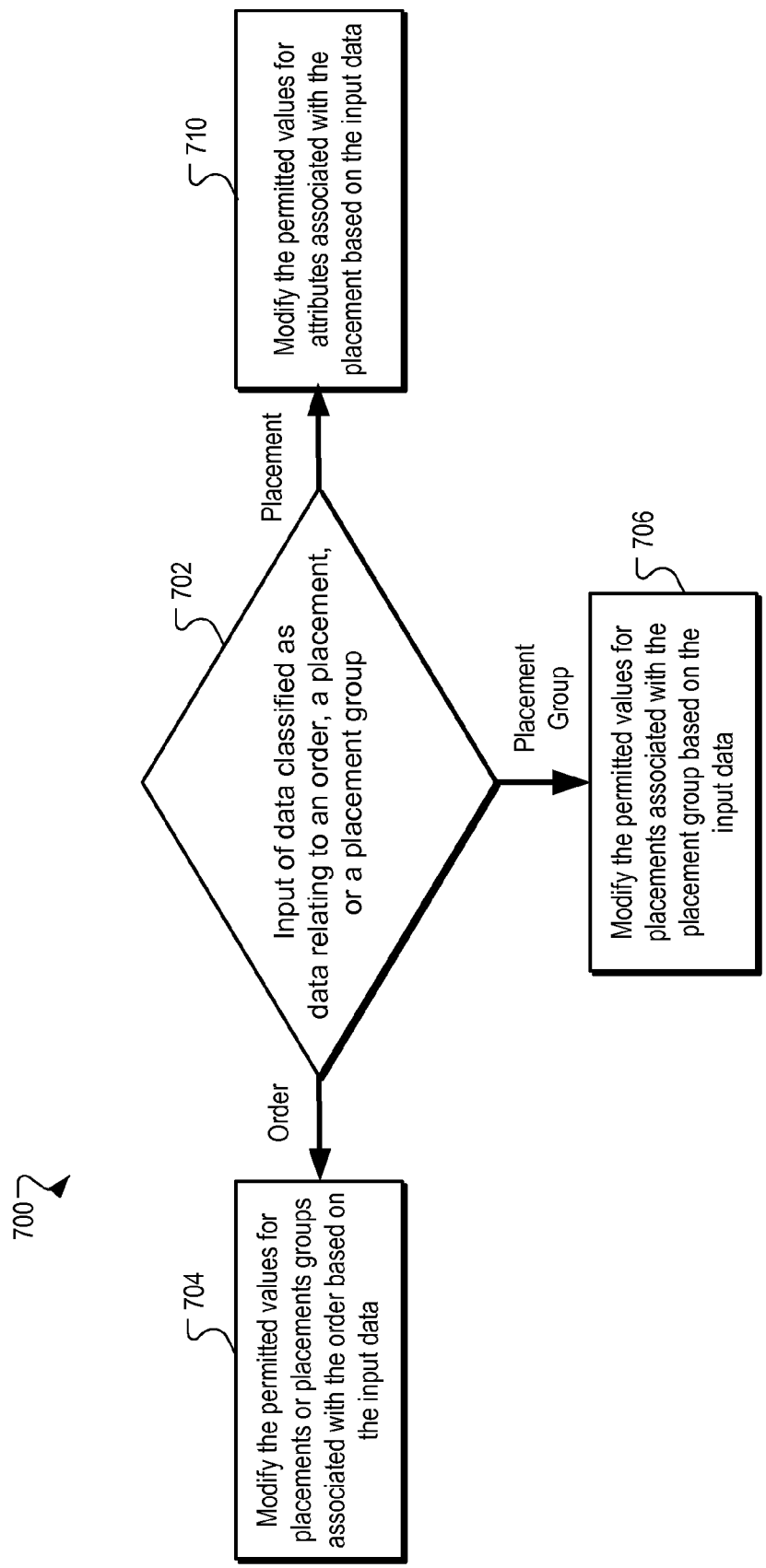

MEDIA PLAN MANAGING

CROSS-REFERENCE TO RELATED APPLICATIONS

This application is a continuation application of, and claims priority to, U.S. patent application Ser. No. 12/194,167, entitled "MEDIA PLAN MANAGING," which was filed on Aug. 19, 2008 and claimed the benefit under 35 U.S.C. §119(e) of U.S. patent application Ser. No. 60/972,077, entitled "MEDIA PLAN MANAGING," filed Sep. 13, 2007. The disclosures of the foregoing applications are incorporated herein by reference in its entirety.

BACKGROUND

This document relates to hierarchical data management.

Advertisers use media plans to define their advertising campaigns and determine where and/or when advertisements will be presented. A media plan thus keeps track of details relating to an advertising campaign, often in hierarchical form. Detailed media plans are common for advertisers and often include multiple advertisements and multiple publishers. However, the more detailed a media plan, the more complex a media plan can become. Generation and maintenance of a media plan can be arduous because of the complexity of the data. Additionally, managing a media plan often requires numerous repetitive replications of the media plan details for similar advertisements.

SUMMARY

Apparatus, systems and methods for managing media plans are disclosed. In one implementation, a media plan data hierarchy is defined as a multi-level hierarchy where the levels include an order level and a placement level. Each level contains conditional input fields. An input form is provided for receiving input data into each of the levels of the data hierarchy. Input data is received from the input form, and the type of the input data is determined. Based on the determination of input type, the conditional input fields for subsequent input data are modified. The input data is stored within the data hierarchy for the advertising campaign.

In another implementation, media plan data is accessed from a data store, the media plan data defining order data and placement data. The media plan data is displayed in a single hierarchical view according to the hierarchy defined by the order data and the placement data. The single hierarchical view is comprised of order data and subordinate placement data.

In another implementation, a system includes a display engine, a dynamic filter, an interface, and an evaluator. The display engine is configured to access campaign data for an advertising campaign in a single view according to the hierarchical relationship between different levels of the campaign data. The dynamic filter is configured to modify permitted values for additional data in levels subordinate to the levels of the campaign data displayed in the single view. The interface is configured to capture entry of the additional campaign data into the single view display. The evaluator is configured to evaluate the validity of the additional campaign data entered into the interface. The validity of the additional campaign data is determined by comparing the additional campaign data against the permitted values for each level in the data hierarchy.

The apparatus, systems and method herein can realize optional advantages. For example, a media plan manager is provided that automates many of the generation and modification components of managing a media plan. The media plan manager can optionally display an entire media plan hierarchy in a single display environment that does not require multiple display environment transitions. These optional advantages, however, need not be realized in all implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram of an implementation of an online advertising system.

FIG. 2 is an example of a media plan managing interface.

FIG. 7 is a flow diagram of an example media plan modification process.

Like reference numbers and designations in the various drawings indicate like elements.

DETAILED DESCRIPTION

Figure 3:
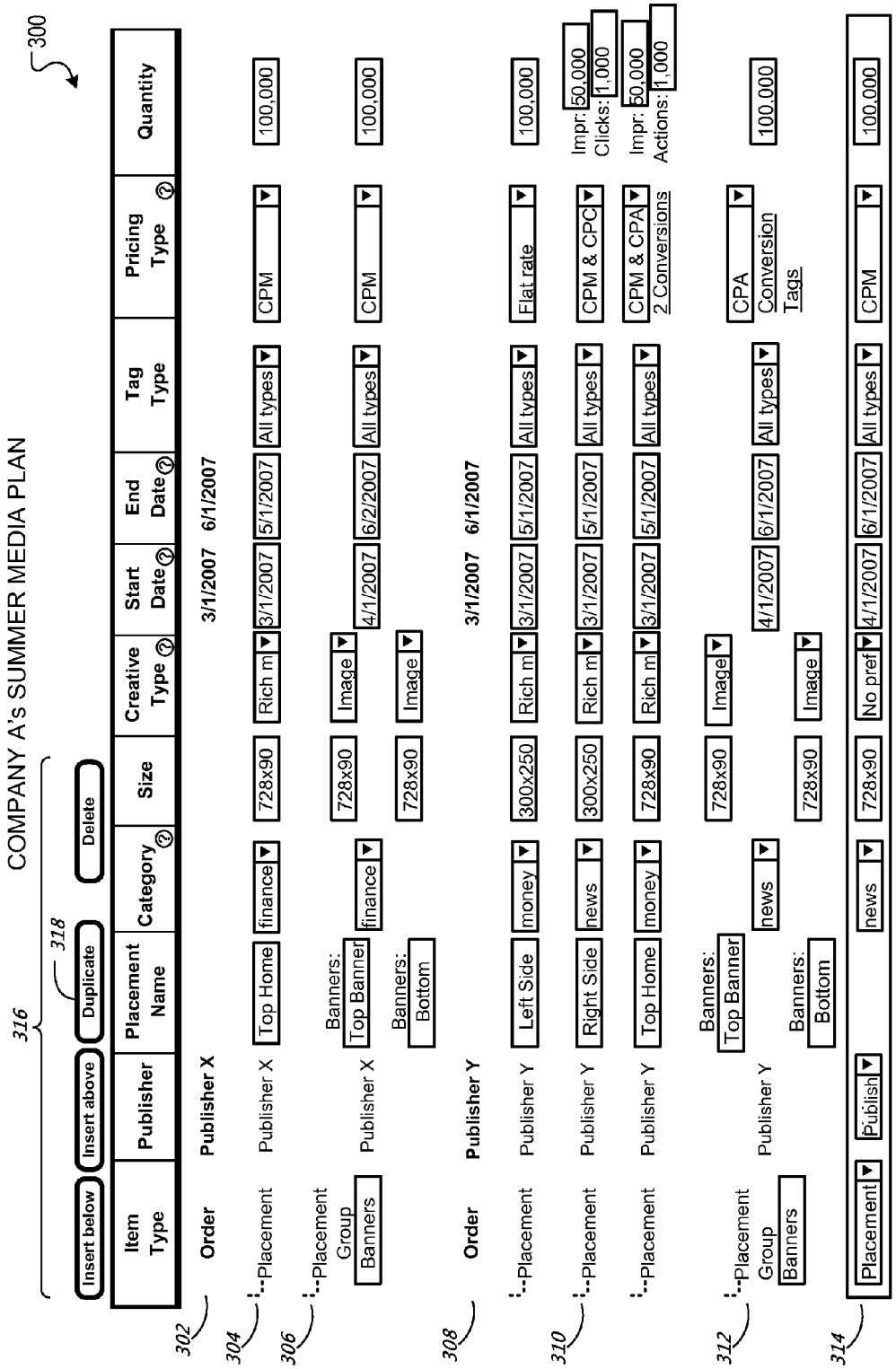
FIG. 3 is another example of the media plan managing interface.

FIG. 1 is a block diagram of an implementation of an online advertising system 100. In some implementations, one or more advertisers 102 can directly, or indirectly, enter, maintain, and track advertisement ("ad") information in an advertising management system 104. Though reference is made to advertising, other forms of content, including other forms of sponsored content, can be delivered by the system 100. The ads may be in the form of graphical ads, such as banner ads, text only ads, image ads, audio ads, video ads, ads combining one of more of any of such components, etc. The ads may also include embedded information, such as a links, meta-information, and/or machine executable instructions. One or more publishers 106 may submit requests for ads to the system 104. The system 104 responds by sending ads to the requesting publisher 106 for placement on one or more of the publisher's web properties. Example properties can includes web pages, television and radio advertising slots, and even print media space. The ads can include embedding links landing pages, e.g., pages on the advertisers 102 websites, that a user is directed to when the user clicks an ad presented on a publisher website.

Other entities, such as users 108 and the advertisers 102, can provide usage information to the system 104, such as, for example, whether or not a conversion or click-through related to an ad has occurred. This usage information can include measured or observed user behavior related to ads that have been served. The system 104 performs financial transactions, such as crediting the publishers 106 and charging the advertisers 102 based on the usage information.

A computer network 110, such as a local area network (LAN), wide area network (WAN), the Internet, or a combination thereof, connects the advertisers 102, the system 104, the publishers 106, and the users 108.

One example of a publisher 106 is a general content server that receives requests for content (e.g., articles, discussion threads, music, video, graphics, search results, web page listings, information feeds, etc.), and retrieves the requested content in response to the request. The content server may submit a request for ads to an ad server in the system 104. The ad request may include a number of ads desired. The ad request may also include content request information. This information can include the content itself (e.g., page or other content document), a category corresponding to the content or the content request (e.g., arts, business, computers, arts—movies, arts—music, etc.), part or all of the content request, content age, content type (e.g., text, graphics, video, audio, mixed media, etc.), geo-location information, etc.

In some implementations, the content server can combine the requested content with one or more of the ads provided by the system 104. This combined content and ads can be sent to the user 108 that requested the content for presentation in a viewer (e.g., a browser or other content display system). The content server can transmit information about the ads back to the ad server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for ads to the system 104. The request may include a number of ads desired. This number may depend on the search results, the amount of screen or page space occupied by the search results, the size and shape of the ads, etc. In some implementations, the number of desired ads will be from one to ten, or from three to five. The request for ads may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the ads provided by the system 104. This combined information can then be forwarded to the user 108 that requested the content. The search results can be maintained as distinct from the ads, so as not to confuse the user between paid advertisements and presumably neutral search results. Finally, the search service can transmit information about the ad and when, where, and/or how the ad was to be rendered back to the system 104.

As can be appreciated from the foregoing, the advertising management system 104 can serve publishers 106, such as content servers and search services. The system 104 permits serving of ads targeted to documents served by content servers. For example, a network or inter-network may include an ad server serving targeted ads in response to requests from a search service with ad spots for sale. Suppose that the inter-network is the World Wide Web. The search service crawls much or all of the content. Some of this content will include ad spots (also referred to as "inventory") available. More specifically, one or more content servers may include one or more documents. Documents may include web pages, email, content, embedded information (e.g., embedded media), meta-information and machine executable instructions, and ad spots available. The ads inserted into ad spots in a document can vary each time the document is served or, alternatively, can have a static association with a given document.

In one implementation, the advertisement management system 104 may include an auction process to select advertisements from the advertisers 102. The advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword, e.g., a word or words in a query. Other bid types, however, can also be used. Based on these bids, advertisements can be selected and ranked for presentation.

In some implementations, the system 104 determines which ads are presented by publishers based on a media plan that defines where and/or when ads should be presented. This information is stored by the system 104 in a media plan. A media plan can include presentment instructions for the advertiser's ads. Presentment instructions can, for example, define dates when an ad is eligible to be submitted to an auction, associated keywords, bid metrics, such as a maximum cost-per-click bid, publishers that are eligible to publish the ad, etc. The media plan identifies a hierarchical relationship between advertisers, their ads, publishers, and placements on publisher's web properties. A media plan managing interface provides an interface for advertisers 102 to edit this hierarchical relationship and customize the placement of their ads.

FIG. 2 is an example of a media plan managing interface 200. The media plan managing interface 200 can be an interface displayed on a display device, such as a client computer, that displays the media plan stored by system 104, or accessed by the system 104, or for which data is provided to the system 104 of FIG. 1.

In some implementations, the highest level within a media plan is an order. Each order is mapped to one publisher. Although there may also be other attributes associated with an order, the order mainly identifies what publishers an advertiser will use in its media plan. For example, the interface 200 displays a media plan for an advertiser. In this example Company A is an advertiser that has two orders—order 202 and order 204—in its summer media plan. The first order in the media plan, order 202, identifies Publisher X as a publisher for Company A's ads. Other order level data may include attributes associated with the order, such as start date 224, end date 226, advertisement types, or other order level attributes. For example, Company A has set a start date of Mar. 1, 2007 and end date of Jun. 1, 2007 for publishing its ads with Publisher X. The media plan indicates that Company A also has an order, order 204, with Publisher Y as the publisher. Thus, Company A also publishes its summer ads on another publisher's web properties.

At this highest level, the media plan defines a set of order-publisher pairs that are associated with the media plan. In some implementations, the next level in the media plan is a placement group. The placement group level is subordinate to the order level, and is an organizational structure used to group together related placements and give related placements the same attributes. In some implementations, each order may be associated with zero or more placement groups. For example, the order 204 contains placement group 212. The placement group 212 refers to all banner ads available on Publisher Y's news web properties. Example properties can includes web pages, television and radio advertising slots, and even print media space. In this example, the properties are web pages, and all of the banner ads are eligible to be published from Mar. 1, 2007 to Jun. 1, 2007. Placement group level data may include attributes shared by such a group of placements, such as category 220 of the placements, size of the placement 222, pricing type for the placement group 228, or the costs associated with the group of placements.

In some implementations, a third level in the media plan is a placement. In such implementations, a placement level is subordinate to the placement group level. Where an order may define what publishers an advertiser is using to publish its ads, a placement may define how that publisher's web properties will be used for presentation of the ads. For example, the placement group 212 contains two subordinate placements—placement 214 and placement 216. The placement level data for placement 214 shows that Company A's ads will be presented on the Top Banner of the news section. The placement level data may include other information as well, such as the placement type, the size 222, and quantity that identify how Publisher Y's news properties will be used by the placements 214 and 216.

In some implementations, a placement may not be displayed as subordinate to a placement group. For example, placement 206, placement 208, and placement 210 are all displayed as separate placements rather than as a member of a placement group. In such implementations, the media plan still stores each placement as a subordinate level to a single member placement group.

In some implementations, where there is only one placement in a placement group, the placement level displays the placement group level data in addition to the placement level data. In this example, the placement 206 may be the only member of the left side block placement group for the money web properties, and the placement 208 may be the only member of the right side block placement group for the news web properties. Because they are single members, these placements are displayed as individual placements rather than as members of a placement group.

In some implementations, the three levels may be all the levels of a media plan. In other implementations, additional levels in the media plan can be included, such as a level for creatives, or another subordinate level for targeting rules and rotation rules.

In some implementations, the media plan user interface 200 displays the entire hierarchical relationship of the media plan in a single view. The single view enables users to view all levels of the hierarchy without requiring multiple display environment transitions, e.g., drill-downs into lower levels, selecting between multiple tabbed pages, etc., that result in different hierarchical display environment instantiation. Additionally, users are able to navigate to all levels in the single view, eliminating the need for a display transition to navigate between levels.

FIG. 3 is another example of the media plan managing interface 300. The interface 300 may be used, for example, to edit the levels of the hierarchy displayed through the interface 200 of FIG. 2.

In some implementations, data in the interface 300 may be edited by different methods, including entering new rows of data, modifying existing rows of data, deleting rows of data, or duplicating rows of data. For example, the interface 300 provides controls 316 for inserting rows, duplicating rows, and deleting rows. The interface 300 may have a field for each data entry that may be edited. Examples of a field include text boxes, drop down menus, radial input fields, edit fields for modification of existing data, additional fields for insertion of new data, and other ways to capture data input.

In some implementations, editing data on the interface is facilitated by inserting new rows of data. The user may choose to enter a new row of data into the media plan, and the interface 300 may provide options as to where the user may enter the new row.

In some implementations, after the user selects where to enter the new row, the interface may provide values for the new level of data. The interface 300 may restrict the input type of the new row based on where the row is being inserted. For example, in some implementations the interface 300 will not allow insertion of an order between levels that are subordinate to an order level. In the example shown on the interface 300, the user can be precluded from inserting a new order row above the row of placement level data 310. In both of these examples, the interface 300 prevents the user from entering an order row where the input type of the new row must be either placement or placement group. The interface 300 may use a conditional input field that restricts the permitted input into that field. For example, the interface 300 may use a drop down box, radial input field, or other form of conditional input in new row 314 that restricts the input type of the new row to a placement, placement group, or any other subordinate level data permitted by the conditional input field.

In some implementations, the interface 300 may also suggest values for the inserted rows, or predict values for the conditional input fields on the inserted rows. The interface 300 may first determine the input type of the inserted rows based on where the row is inserted. The interface 300 may then implement a set of rules that suggest values that are repetitively entered based on the input type of the new row. The rules may specify that repetitive values are copied to newly entered rows or, in some implementations they may attempt to predict values for the newly entered rows. For example, if the user chooses to insert the new row 314 beneath a placement level row or the placement group level row 310, the interface 300 may suggest that the inserted row is of input type placement or placement group. In this example, inserting a row under the banners placement group row, the row 310, defaulted the row to a type of placement.

In some implementations, the interface 300 may then suggest placement or placement group level data values that are likely to be repeated in the newly inserted row 314, and copy those values into the newly inserted row 314. The interface 300 may suggest values based on placement levels or placement group levels under the order 308, for example the placement 310 or placement group 312. Alternatively, the interface 300 may suggest values directly from the parent level of the newly inserted row. For example, the row for the order 308 is a parent level of the newly inserted row 314, and thus some of the values in the order 308 may be present in subordinate levels. The user can modify the placement or placement group level attributes in the newly inserted row 314, or accept the suggested values.

In some implementations, modifications of data in the interface 300 will affect not only the modified values, but also subsequently entered data. Subsequently entered data may include subordinate data levels, parent data levels, or sibling data levels. For example, modifying the start date of the order 302 can affect the available start dates of the placement 304 or the placement group 304, or any subsequently entered placement that is subordinate to 302.

The interface 300 may use other methods for inserting new rows of data. The interface may provide the controls 316 that allow the user to make duplicates of existing rows, for example. In such implementations, insertion of a duplicate row may create a new row and copy the values from an existing level into the newly created level. When using duplicate control 318, some implementations may also copy all subordinate levels of data. For example, if order 302 is duplicated, a new row would be created with all of the values from the order 302 copied to the new level. Because the order 302 also has subordinate placement level 304 and subordinate placement group level 306, the newly created order would also have two newly created subordinate levels with the values from the placement level 304 and the placement group level 306 copied into the newly created subordinate levels. In this example, another order associated with Publisher X would be created if the order 302 was duplicated. Additionally, the placement and the placement group under Publisher X would also be duplicated.

Figure 4:
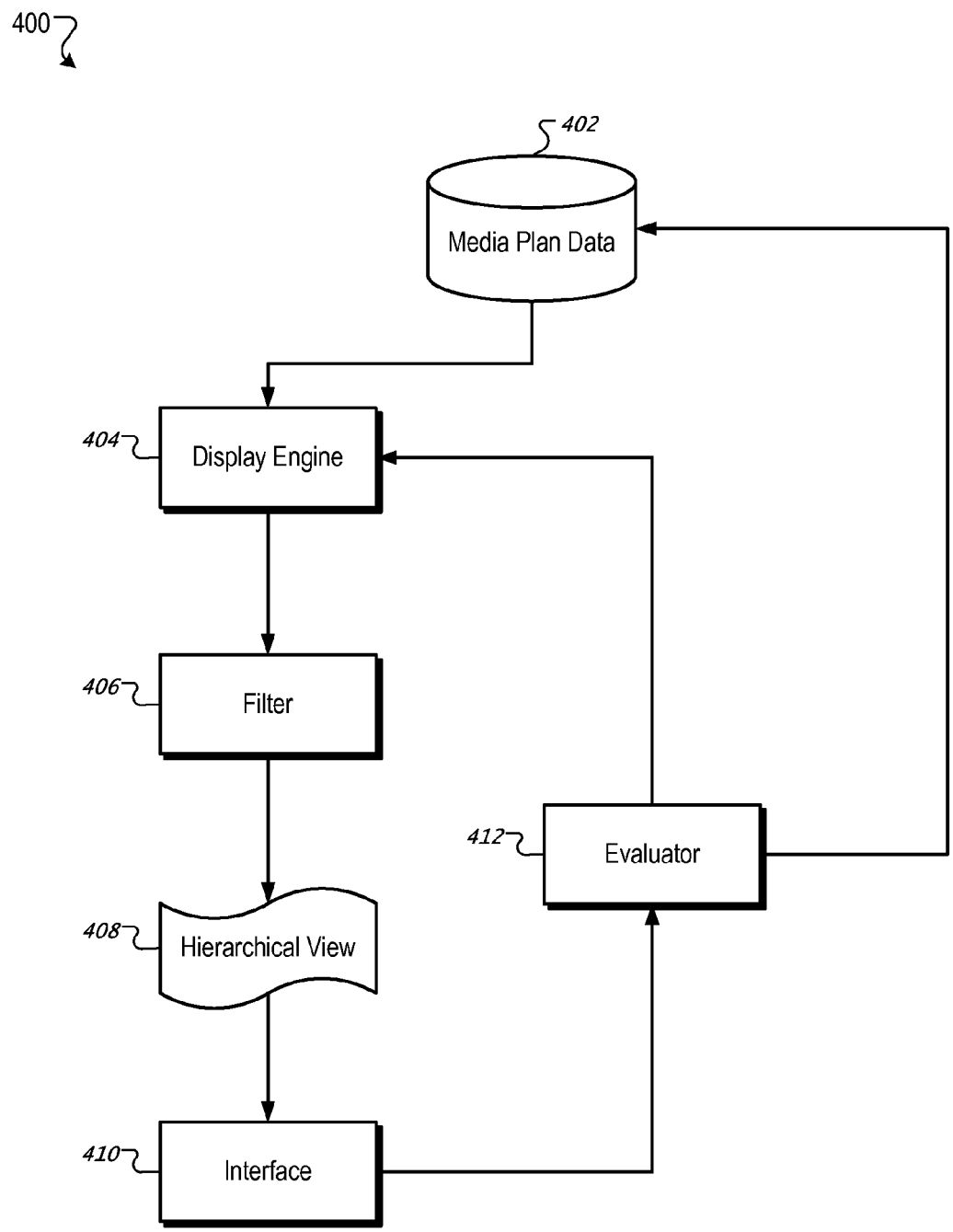
FIG. 4 is a block diagram of an example media plan managing system.

FIG. 4 is a block diagram of an example media plan managing system 400. The system 400 can, for example, be used to generate data that causes a computer device to display the interfaces 200 and 300 of FIGS. 2 and 3.

In an implementation, display engine 404 accesses the media plan data from a database that stores media plan data 402. In some implementations, the media plan data may include order level data, placement group level data, placement level data, and the hierarchical relationship between the levels. The display engine 404 generates a single view display for the media plan data 402 according to the hierarchical relationship between the data levels.

The system 400 can include dynamic filter 406 to create modification rules throughout the data hierarchy. The single view display generated by the display engine 404 is displayed in hierarchical view 408, and the modification rules generated by the dynamic filter 406 are associated with the different levels of data displayed in the hierarchical view 408. The modification rules may serve to restrict modification of the hierarchical data to values permitted by the rules. The filter 406 can generate the rules based on the different levels of data and determining what values may be permitted for any related data levels. For example, a modification rule specified by the dynamic filter 406 can restrict the placement dates that are available for a specific placement based on the dates associated with the parent order. In another implementation, the dynamic filter can process the parent level data to create a set of modification rules to generate suggested values when inserting new subordinate data levels. Other filtering operations can also be implemented.

In some implementations, an interface 410 may be used to capture modifications to the hierarchical view 408. For example, the interface 410 can be a web page that is served to a client device, and the display engine 404 can generate the underlying web page instructions that, when rendered by a client device, cause the interface to be rendered on the client device. Other implementations can also be used, e.g., instructions that upon execution cause a client device to carry out the interface functions. Such instructions can include interpreted instructions, such as script instructions, e.g., JavaScript or ECMAScript instructions that can be executed in a web browser environment.

The modification rules generated by the dynamic filter 406 can, for example, preclude particular modifications. In other implementations, the modification rules can suggest values for the modifications. For example, one modification rule may limit the types of advertisements that are available for a placement to limited advertisements. In such an implementation, when a user attempts to add a new placement or modify an existing placement, the interface 410 may provide only the limited types of advertisement as option types. In other implementations, the interface 410 may provide one of the available advertisement types as a suggested type for the placement. The interface 410 may capture these modifications to the data, as well as modifications that are not suggested or limited by the modification rules set up by the filter 408.

The modifications to the data entered through the interface 410 may be analyzed by evaluator 412 to determine if the modified data is valid for the data level where it is entered. The evaluator 412 may first have to determine what data level the entry is associated with. If the data entered is valid for that data level, it may be saved with the rest of media plan data 402 and redisplayed through the display engine 404. If the data entered is invalid, it may not be saved and instead the display engine 404 may generate a notification of the error. For example, if the user enters a new order and placements associated with the order through the interface 410, there may not be any modification rules associated with the newly entered data. The new order and placement level data can be processed by the evaluator 412, and if the placement data is determined to be acceptable for a subordinate level of the new order, then that data may be saved in the database and redisplayed through the display engine 404.

Figure 5:
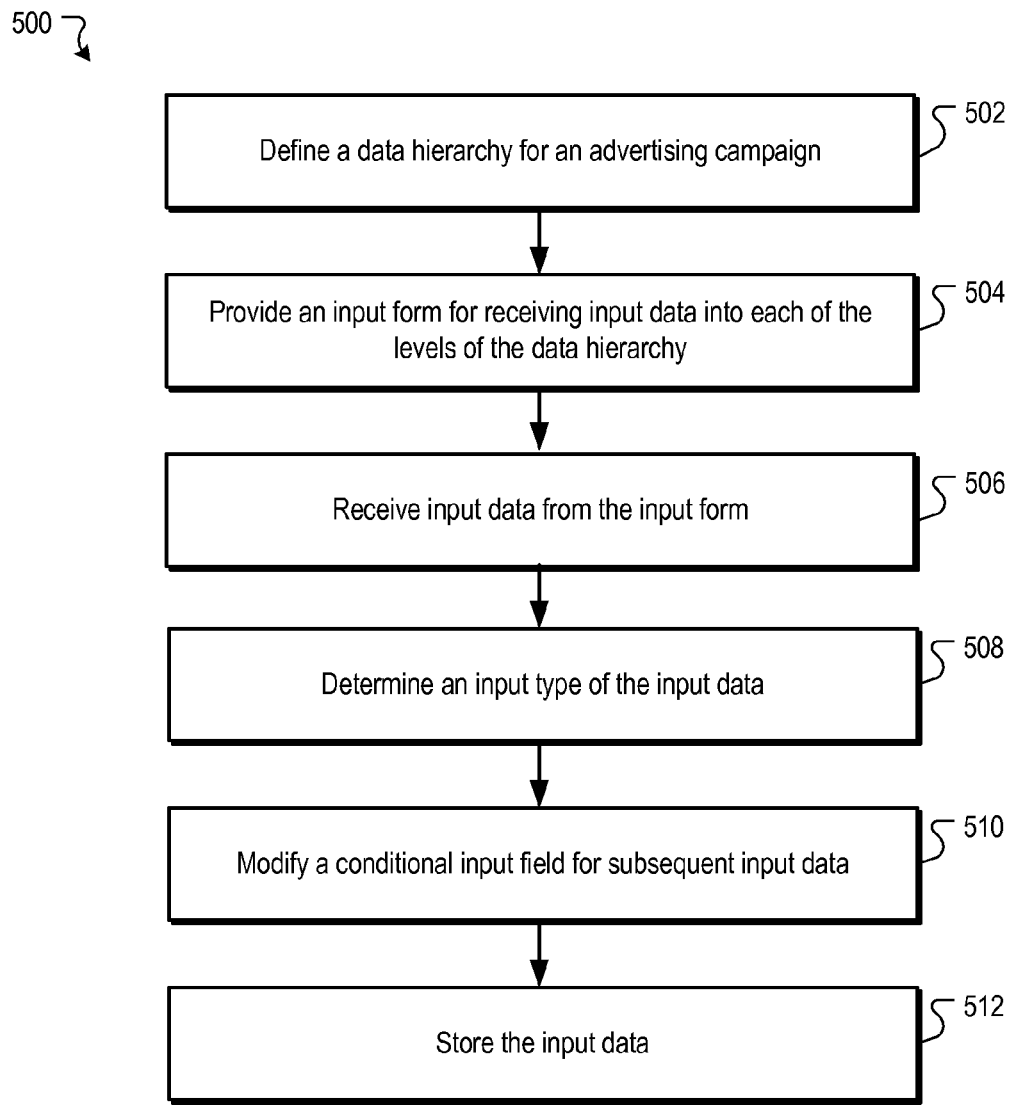
FIG. 5 is a flow diagram of an example media plan managing process.

The display engine 404, the filter 406, and the evaluator 412 can be implemented in a server device, such as a web server, or can be distributively implemented in both client and server devices. The display engine 404, the filter 406, and the evaluator 412 can be defined by instructions that upon execution cause a web server and/or client device to realize the functions described above. Such instructions can include interpreted instructions, such as script instructions, e.g., JavaScript or ECMAScript instructions that can be executed in a web browser environment. Other implementations can also be used. FIG. 5 is a flow diagram of a media plan managing process 500. The process 500 can, for example, be implemented in the media plan managing system 400 of FIG. 4.

Stage 502 defines a data hierarchy for an advertising campaign. For example, the data stored in the database 402 can be used to define a media plan hierarchy of the type described with reference to FIGS. 1 and 2.

Stage 504 provides an input form for receiving input data into each of the levels of the data hierarchy. For example, a server device may provide HTML code that generates the interface 410 on a client device. The interface 410 may provide editable fields to capture the user's modifications of the hierarchical view 408, such as the fields described with reference to user interface input form FIG. 3.

Stage 506 receives input data from the input form. For example, the interface 410 may capture input in the editable fields provided, and captured input is provided to a server device.

Stage 508 determines an input type of the input data. For example, the evaluator 412 may determine whether the data input relates to an order, a placement or a placement group.

Stage 510 modifies a conditional input field for subsequent input data. For example, the filter 408 may generate modification rules that are associated with the media plan data that is passed to the filter 408 by the display engine 404. The modification rules would include rules for data that is modified. The modifications rules would identify permitted values for any input data that is subsequently entered into the interface 410.

Stage 512 stores the input data. For example, the evaluator 412 may store the modified media plan, including any inputted data, into the database 402.

Figure 6:
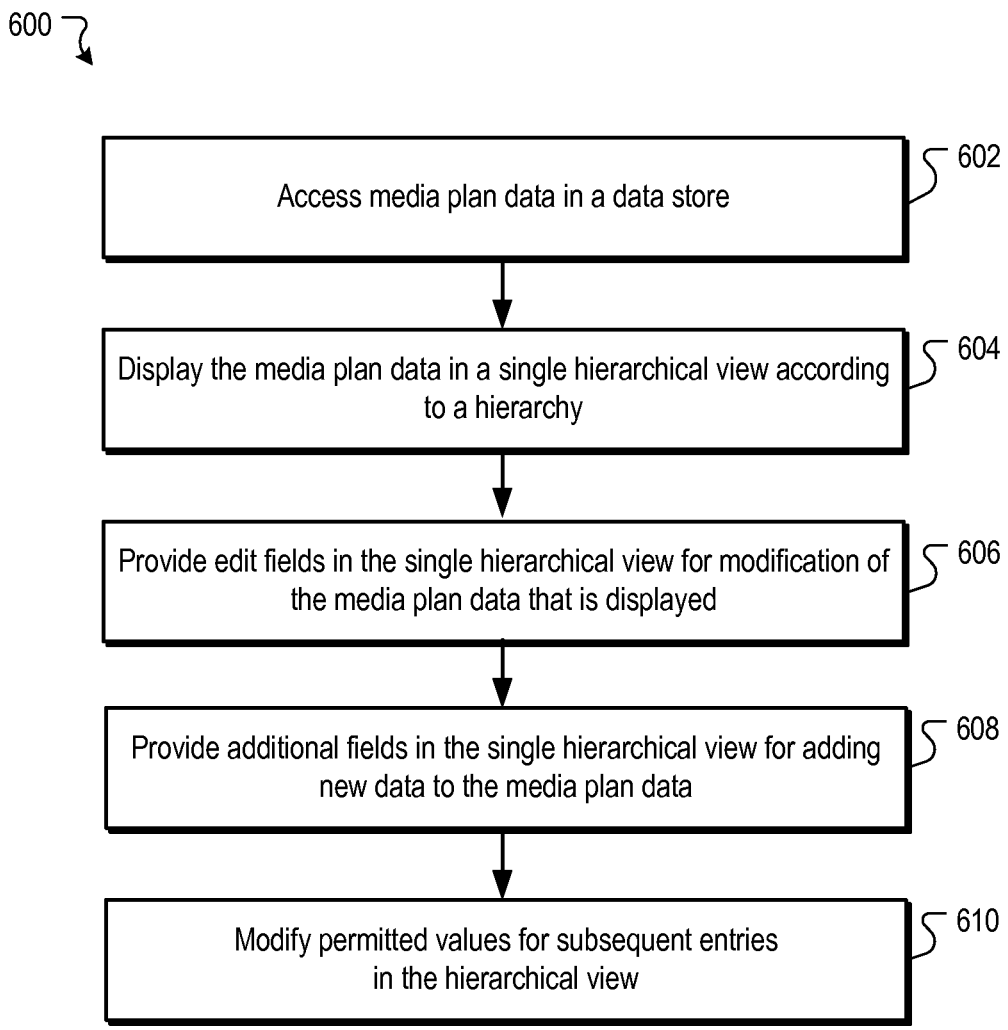
FIG. 6 is a flow diagram of another example media plan managing process.

FIG. 6 is a flow diagram of another media plan managing process 600. The process 600 can, for example, be implemented in the media plan managing system 400 of FIG. 4.

Stage 602 accesses media plan data in a data store. For example, the system 400 can be used to access media plan data 402.

Stage 604 displays the media plan data in a single hierarchical view according to a hierarchy. For example, the display engine 404 can be used to format the media plan data in a single view that is later displayed in a hierarchical view 408, such as the view shown in FIGS. 2 and 3

Stage 606 provides edit fields in the single hierarchical view for modification of the media plan data that is displayed. For example, the interface 410 provides edit fields for the hierarchical view 408, and captures modifications to those edit fields, such as described in FIG. 3.

Stage 608 provides additional fields in the single hierarchical view for adding new data to the media plan data. For example, the interface 410 provides additional fields for the hierarchical view 408, and captures modifications to those additional fields. In another example, the interface 300 provides the controls 316 for adding new rows of data. The controls may provide additional fields in the interface where data may be entered.

Stage 610 modifies permitted values for subsequent entries in the hierarchical view. For example, the filter 408 modifies permitted values for modifications of the hierarchical view 408 through the interface 410. The filter 408 may generate modification rules that are associated with the edit fields and the additional fields displayed through the interface. The modification rules may restrict the permitted values for entries into the interface 410. For example, a modification rule may require that all advertisements published by Publisher X are in the category of finance. If placement 314 was inserted as a placement subordinate to order 302, or if the publisher attribute for placement 314 is modified to Publisher X rather than Publisher Y, the filter 408 may modify the category for the newly created placement 314 from new to finance.

FIG. 7 is a flow diagram of an example media plan modification process 700. The process 700 can, for example, be implemented by the media plan managing system 400 of FIG. 4.

Stage 702 classifies the input of data as data relating to an order, a placement, or a placement group. For example, a placement location can be modified through the interface 410. The evaluator 412 would evaluate this data as data relating to a placement.

If stage 702 classifies the input of data as data relating to an order, stage 704 modifies the permitted values for placements or placements groups associated with the order based on the input data. For example, changing an order availability date through the interface 410 may be classified by the evaluator 412 as a data change that is related to an order. Thus, stage 704 may modify the availability dates for placements and placement groups associated with the order.

If stage 702 classifies the input of data as data relating to a placement group, stage 706 modifies the permitted values for placements associated with the placement group based on the input data. For example, changing the pricing type of a placement group through the interface 410 may be classified by the evaluator 412 as a data change that is related to a placement group. Thus, stage 706 may modify the pricing types for placements associated with the placement group.

If stage 702 classifies the input of data as data relating to a placement, stage 708 modifies the permitted values for attributes associated with the placement based on the input data. For example, changing the placement location of a placement through the interface 410 may be classified by the evaluator 412 as a data change that is related to a placement. Thus, stage 708 may modify the different ad sizes available for an advertisement size attribute associated with the placement.

Although the examples above refer to media plans, other data in hierarchical form can also be managed according to the systems and methods disclosed herein.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing, by one or more computers, a campaign interface through which input data for a data hierarchy of an advertising campaign are received, a display of the campaign interface including a first input field through which data is input for an order level of the data hierarchy and a conditional input field through which data is input for a placement group level that is subordinate to the order level, the conditional input field being an input field through which a value is specified for a same attribute of all placements that are assigned to the placement group level, wherein the first input field and the conditional input field are both presented in a same campaign interface display;
receiving, by the one or more computers, order level data through the first input field; and
modifying, by the one or more computers, the conditional input field based on the received order level data, the conditional input field being modified to limit a range of permitted values that are permitted to be specified through the conditional input field and for the same attribute of all the placements that are assigned to the placement group level.

2. The method of claim 1, further comprising:
receiving, through the conditional input field, placement group data that specify an input value that is included in the permitted values; and
updating, based on the input value, the same attribute of all the placements that are assigned to the placement group level.

3. A computer-implemented method comprising:
providing, by one or more computers, a campaign interface through which input data for a data hierarchy of an advertising campaign are received, the campaign interface including a first input field for an order level of the data hierarchy and a conditional input field for a placement group level that is subordinate to the order level, the conditional input field being an input field in which a value is specified for a same attribute of all placements that are assigned to the placement group level;
receiving, by the one or more computers, order level data through the first input field;
modifying, by the one or more computers, the conditional input field based on the received order level data, the conditional input field being modified to limit a range of permitted values that are permitted to be specified for the same attribute of all the placements that are assigned to the placement group level;
receiving, through the conditional input field, placement group data that specify an input value that is included in the permitted values;
updating, based on the input value, the same attribute of all the placements that are assigned to the placement group level; and
in response to receiving the placement group data and for each placement that is assigned to the placement group level:
presenting the input value in a placement input field for the same attribute; and
restricting, to the range of permitted values, values that are permitted to be input through the placement input field.

4. The method of claim 3, further comprising:
for one of the placements that is assigned to the placement group level:
receiving a placement input value for the same attribute of the one of the placements;
determining that the input value is within the range of permitted values; and
in response determining that the placement input value is within the range of permitted values, updating the same attribute of only the one of the placements, the same attribute being updated to have the placement input value.

5. The method of claim 1, further comprising:
receiving data requesting addition of an added placement to the placement group level;
providing additional fields in which attributes of the added placement are specified; and
restricting, to the range of permitted values, an additional input field in which a value of the same attribute is specified for the added placement.

6. The method of claim 1, wherein:
receiving the order level data comprises receiving an order end date indicative of a date at which distribution of advertisements to placements in the order is scheduled to end; and
modifying the conditional input field comprises restricting, based on the order end date, a range of permitted placement group end dates that are permitted to be specified through the conditional input field.

7. The method of claim 6, further comprising:
receiving, through the conditional input field, a placement group end date that is within the range of permitted placement group end dates; and
updating, for each placement that is assigned to the placement group, an end date for the placement to the received placement group end date.

8. The method of claim 1, further comprising:
receiving data requesting insertion of a new row into the data hierarchy;
determining a level of the data hierarchy at which the new row is being inserted;
identifying, based at least in part on the level, an attribute value that has been specified for an attribute of a parent of the new row in the data hierarchy; and
restricting, based on the identified attribute value, permitted values for an input field through which a value of the attribute is specified for the new row.

9. A system, comprising:
a data store storing advertising campaign data in a data hierarchy, the data hierarchy having an order level in which order level data are stored and a placement group level that is subordinate to the order level; and
one or more computers that interact with the data store, the one or more computers including instructions that cause the one or more computers to perform operations comprising:
providing a campaign interface through which input data for the data hierarchy are received, a display of the campaign interface including a first input field through which data is input for the order level and a conditional input field through which data is input for the placement group level, the conditional input field being an input field through which a value is specified for a same attribute of all placements that are assigned to the placement group level, wherein the first input field and the conditional input field are both presented in a same campaign interface display;
receiving order level data through the first input field; and
modifying the conditional input field based on the received order level data, the conditional input field being modified to limit a range of permitted values that are permitted to be specified through the conditional input field and for the same attribute of all the placements that are assigned to the placement group level.

10. The system of claim 9, wherein the one or more computers further include instructions that cause the one or more computers to perform operations comprising:
receiving, through the conditional input field, placement group data that specify an input value that is included in the permitted values; and
updating, based on the input value, the same attribute of all the placements that are assigned to the placement group level.

11. The system of claim 10, wherein the one or more computers further include instructions that cause the one or more computers to perform operations comprising:
in response to receiving the placement group data and for each placement that is assigned to the placement group level:

presenting the input value in a placement input field for the same attribute; and restricting, to the range of permitted values, values that are permitted to be input through the placement input field.

12. The system of claim 11, wherein the one or more computers further include instructions that cause the one or more computers to perform operations comprising:

for one of the placements that is assigned to the placement group level:

receiving a placement input value for the same attribute of the one of the placements;

determining that the input value is within the range of permitted values; and in response determining that the placement input value is within the range of permitted values, updating the same attribute of only the one of the placements, the same attribute being updated to have the placement input value.

13. The system of claim 9, wherein the one or more computers further include instructions that cause the one or more computers to perform operations comprising:

receiving data requesting addition of an added placement to the placement group level;

providing additional fields in which attributes of the added placement are specified; and restricting, to the range of permitted values, an additional input field in which a value of the same attribute is specified for the added placement.

14. The system of claim 9, wherein:

receiving the order level data comprises receiving an order end date indicative of a date at which distribution of advertisements to placements in the order is scheduled to end; and modifying the conditional input field comprises restricting, based on the order end date, a range of permitted placement group end dates that are permitted to be specified through the conditional input field.

15. The system of claim 14, wherein the one or more computers further include instructions that cause the one or more computers to perform operations comprising:

receiving, through the conditional input field, a placement group end date that is within the range of permitted placement group end dates; and updating, for each placement that is assigned to the placement group, an end date for the placement to the received placement group end date.

16. The system of claim 9, wherein the one or more computers further include instructions that cause the one or more computers to perform operations comprising:

receiving data requesting insertion of a new row into the data hierarchy;

determining a level of the data hierarchy at which the new row is being inserted;

identifying, based at least in part on the level, an attribute value that has been specified for an attribute of a parent of the new row in the data hierarchy; and restricting, based on the identified attribute value, permitted values for an input field through which a value of the attribute is specified for the new row.

17. A non-transitory computer storage medium encoded with a computer program, the program comprising instructions that when executed by data processing apparatus cause the data processing apparatus to perform operations comprising:

providing a campaign interface through which input data for a data hierarchy of an advertising campaign are received, a display of the campaign interface including a first input field through which data is input for an order level of the data hierarchy and a conditional input field through which data is input for a placement group level that is subordinate to the order level, the conditional input field being an input field through which a value is specified for a same attribute of all placements that are assigned to the placement group level, wherein the first input field and the conditional input field are both presented in a same campaign interface display;

receiving order level data through the first input field; and modifying the conditional input field based on the received order level data, the conditional input field being modified to limit a range of permitted values that are permitted to be specified through the conditional input field and for the same attribute of all the placements that are assigned to the placement group level.

18. The computer storage medium of claim 17, wherein the program further comprises instructions that cause the data processing apparatus to perform operations comprising:

receiving, through the conditional input field, placement group data that specify an input value that is included in the permitted values; and updating, based on the input value, the same attribute of all the placements that are assigned to the placement group level.

19. The computer storage medium of claim 18, wherein the program further comprises instructions that cause the data processing apparatus to perform operations comprising:

in response to receiving the placement group data and for each placement that is assigned to the placement group level:

presenting the input value in a placement input field for the same attribute; and restricting, to the range of permitted values, values that are permitted to be input through the placement input field.

20. The computer storage medium of claim 19, wherein the program further comprises instructions that cause the data processing apparatus to perform operations comprising:

for one of the placements that is assigned to the placement group level:

receiving a placement input value for the same attribute of the one of the placements;

determining that the input value is within the range of permitted values; and in response determining that the placement input value is within the range of permitted values, updating the same attribute of only the one of the placements, the same attribute being updated to have the placement input value.

21. The computer storage medium of claim 17, wherein the program further comprises instructions that cause the data processing apparatus to perform operations comprising:

receiving data requesting addition of an added placement to the placement group level;

providing additional fields in which attributes of the added placement are specified; and restricting, to the range of permitted values, an additional input field in which a value of the same attribute is specified for the added placement.

22. The computer storage medium of claim 17, wherein:

receiving the order level data comprises receiving an order end date indicative of a date at which distribution of advertisements to placements in the order is scheduled to end; and modifying the conditional input field comprises restricting, based on the order end date, a range of permitted placement group end dates that are permitted to be specified through the conditional input field.

23. The computer storage medium of claim 22, wherein the program further comprises instructions that cause the data processing apparatus to perform operations comprising:
   receiving, through the conditional input field a placement group end date that is within the range of permitted placement group end dates; and
   updating, for each placement that is assigned to the placement group, an end date for the placement to the received placement group end date.

24. The computer storage medium of claim 17, wherein the program further comprises instructions that cause the data processing apparatus to perform operations comprising:
   receiving data requesting insertion of a new row into the data hierarchy;
   determining a level of the data hierarchy at which the new row is being inserted;
   identifying, based at least in part on the level, an attribute value that has been specified for an attribute of a parent of the new row in the data hierarchy; and
   restricting, based on the identified attribute value, permitted values for an input field through which a value of the attribute is specified for the new row.

* * * * *